United States Patent
West (10) Patent No.: US 6,773,492 B1
(45) Date of Patent: Aug. 10, 2004

(54) SYSTEM EMPLOYING A VORTEX TUBE FOR SEPARATING AN ENTRAINED LIQUID COMPONENT FROM A GAS STREAM

(75) Inventor: Hugh M. West, St. Albert (CA)

(73) Assignee: National Tank Company, Houston, TX (US)

(*) Notice: Subject to any disclaimer, the term of this patent is extended or adjusted under 35 U.S.C. 154(b) by 0 days.

(21) Appl. No.: 10/425,042

(22) Filed: Apr. 24, 2003

Related U.S. Application Data (62) Division of application No. 09/880,627, filed on Jun. 13, 2001, now Pat. No. 6,576,029.

(51) Int. Cl.[7] .................................................. B01D 45/12
(52) U.S. Cl. ........................... 96/189; 55/414; 55/421; 55/424; 55/459.1; 55/466
(58) Field of Search ......................... 96/188, 189, 190; 55/349, 414, 421, 424, 459.1, 466

(56) References Cited

U.S. PATENT DOCUMENTS

| | | | |
|---|---|---|---|
| 1,836,004 A | | 12/1931 | Becker |
| 2,784,803 A | * | 3/1957 | Saxton ......................... 55/327 |
| 2,808,897 A | | 10/1957 | Reinsch et al. ............... 183/25 |
| 3,014,553 A | * | 12/1961 | Jerman et al. ................ 96/212 |
| 3,296,774 A | | 1/1967 | Hoogendoorn et al. |
| 3,498,028 A | | 3/1970 | Trouw |
| 3,581,467 A | | 6/1971 | Donnelly |
| 3,605,388 A | | 9/1971 | Zuiderweg et al. |
| 3,662,521 A | | 5/1972 | Behar et al. |
| 3,930,816 A | | 1/1976 | Miczek |
| 4,128,406 A | | 12/1978 | Spevack |
| 4,486,203 A | | 12/1984 | Rooker |
| 4,838,906 A | | 6/1989 | Kiselev |
| 4,880,451 A | | 11/1989 | Konijn |
| 5,145,612 A | | 9/1992 | Reay et al. ................. 261/79.2 |
| 5,683,629 A | | 11/1997 | Konijn ....................... 261/79.2 |
| 5,714,068 A | | 2/1998 | Brown ........................ 210/519 |

* cited by examiner

*Primary Examiner*—Robert A. Hopkins
(74) *Attorney, Agent, or Firm*—Gable & Gotwals; Paul H. Johnson (57) ABSTRACT

A system for separating an entrained liquid component from a gas stream employing at least one vortex tube having a liquid outlet end and a wet gas inlet tangential to its sidewall and arranged so that wet gas rotates within the vortex tube to cause the liquid components to be forced against the interior wall surface by centrifugal action. An orifice plate closing the vortex tube first end has a concentric gas outlet opening therein. A vortex finder tube extends concentrically within the vortex tube providing an annular area between itself and the vortex tube internal wall. A gas deflector positioned within the annular area has a downwardly spiraled surface that diverts wet gas downwardly away from the wet gas inlet. In one embodiment, an outlet tube is affixed to the orifice plate central opening and is configured to divert outlet gas downwardly. In another embodiment, an energy absorbing housing surrounds the vortex tube liquid outlet end.

17 Claims, 5 Drawing Sheets

SYSTEM EMPLOYING A VORTEX TUBE FOR SEPARATING AN ENTRAINED LIQUID COMPONENT FROM A GAS STREAM

REFERENCE TO PENDING APPLICATIONS

This is a divisional application of U.S. patent application Ser. No. 09/880,627 filed on Jun. 13, 2001, now U.S. Pat. No. 6,576,029 entitled SYSTEM FOR SEPARATING AN ENTRAINED LIQUID COMPONENT FROM A GAS STREAM.

REFERENCE TO MICROFICHE APPENDIX

This application is not referenced in any Microfiche Appendix.

BACKGROUND OF THE INVENTION

This disclosure is to an improved vortex tube for use in separating an immiscible liquid component from a gas stream and more particularly for a system and a method of operating a system for separating liquid components from a gas stream. An example of an application of the invention is for separating entrained water from a natural gas stream.

The subject of the invention generally relates to gas/liquid separators or gas/liquid/solid separators. Separators of this type are typically process vessels that may be at atmospheric or above atmospheric pressures. The main function of the separator system is to segregate immiscible phases of the process stream such as when the process stream is the form of a gas, such as natural gas that carries with it an immiscible liquid component. The function of the separator of this invention is to separate out the liquid component to provide at the output of the separator a gas stream that is relatively free from entrained liquids.

Separators for separating liquid components from a gas stream are commonly utilized in the oil and gas industry, specifically in oil and gas production, oil refining and gas processing. While very commonly utilized in the oil and gas industry, separators of this type are also used in the mining industry, chemical plants, water treatment facilities, pulp and paper plants and pharmaceutical manufacturing facilities. Separators can be designed to separate a two-phase stream—that is, a vapor/liquid stream or a three-phase stream—that is, a vapor/organic liquid/aqueous stream or a four-phase stream—that is, a vapor/organic liquid/aqueous liquid/solids stream.

Separation of immiscible components of the stream usually and ultimately depend on the force of gravity. Gravity can be either natural gravity—that is, the pull of objects towards the center of the earth or created gravitational forces such as represented by centrifugal separators. Natural gravity is usually used by flowing a stream having immiscible components into a vessel which provides a quiescent zone—that is, a relatively undisturbed environment that allows gravity to act on heavier components of the stream and move them into a downward part of the vessel. This movement has the counteraction of the lighter components of the stream migrating to an upward part of the vessel. In this way, the heavier components—that is, liquids, can be withdrawn from the lower part of the vessel and the lighter components—that is, gases, withdrawn from an upper part of the vessel.

Another type of gravitational separator utilizes artificial gravity attained by centrifugal force. One way of generating artificial gravity is by the use of a vortex tube. A vortex tube is typically an elongated tube having a cylindrical interior wall that is preferably vertically mounted or at least mounted with a vertically downward tangent. Adjacent an upper end of the vessel is an inlet opening into the vortex tube, the inlet being arranged so that fluids flowing therein tangentially intersect the interior wall of the vortex tube and flow around the interior wall thereby creating centrifugal force that is applied to the components, the centrifugal force serving to move the heavier component—that is, the liquid component, towards the wall of the vortex tube while the lighter component is forced towards the interior of the vortex tube. In a typical vortex tube the gas is withdrawn from an upper central vortex opening while the liquid component is withdrawn from a liquid outlet in the bottom portion of the vortex tube. The invention herein pertains to improvements to vortex tubes and to methods of using the improved vortex tubes for separation of immiscible components of a gas stream.

For background information relating to the general subject matter of this invention reference may be had to the following previously issued United States patents:

| PATENT NO. | INVENTOR | TITLE |
| --- | --- | --- |
| 1,836,004 | Becker | Apparatus for Treating Gas |
| 2,808,897 | Reinsch et al | Apparatus for Contacting Liquid and Vaporous Materials |
| 3,296,774 | Hoogendorn et al | Gas-Liquid Contactor with Wall Obstructions and Contacting Method |
| 3,498,028 | Trouw | Apparatus for Contacting Liquids and Gases |
| 3,581,467 | Donnelly | Method and Apparatus for Vortical Liquid-Gas Movement |
| 3,605,388 | Zuiderweg et al | Apparatus for Contacting Liquids and Gases |
| 3,662,521 | Behar et al | Device for Reaction Between Liquid Phase and Gaseous Phase |
| 3,930,816 | Miczek | Structure for a Gas and Liquid Contacting Chamber in a Gas Effluent Processing System |
| 4,128,406 | Spevack | Contact Apparatus for Multiphase Processing |
| 4,486,203 | Rooker | Inlet Momentum Absorber for Fluid Separation |
| 4,838,906 | Kiselev | Contact-and-Separating Element |
| 4,880,451 | Konijn | Gas/Liquid Contacting Apparatus |
| 5,145,612 | Reay et al | Apparatus for Mixing Vapor in a Countercurrent Column |
| 5,683,629 | Konijn | Horizontal Tray and Column for Contacting Gas and Liquid |
| 5,714,068 | Brown | Inlet Device for Large Oil Field Separator |

BRIEF SUMMARY OF THE INVENTION

Separators are process vessels, commonly pressurized, which segregate immiscible phases of a process stream. They are commonly used in oil and gas production, oil refining, gas processing, mining, chemical plants, waste water treatment, pulp and paper, and pharmaceutical plants. They separate two-phase streams (vapor/liquid), three-phase streams (vapor/organic liquid/aqueous liquid) or four-phase streams (vapor/organic liquid/aqueous liquid/solids). Separators commonly have an inlet momentum absorber or deflector intended to utilize or reduce fluid incoming momentum, and distribute liquid and gas. This energy reduction initiates phase separation inside the separator vessel. These inlet devices are then followed by various types of de-misting, de-foaming, and/or liquid coalescing apparatus.

The most common separator inlet device is a "splash plate"—that is, a flat, curved or dished impingement plate that intercepts the incoming flow stream. Fluids are allowed to rebound in a direction considered least destructive to the quiescence of the bulk phases residing in the vessel. Splash plates are characterized by relatively high rebound turbulence. A diffusion inlet is another generic type of inlet device. It typically divides the flow stream into multiple smaller streams and reduces momentum by gradual enlargement of the flow areas of each stream.

The invention herein relates to a "vortex tube" that is frequently utilized in a "vortex tube cluster". A vortex tube can be used as a momentum dissipating inlet device and can eliminate other phase separation elements as well. A vortex tube has an inlet through which fluids enter tangentially creating rotational flow. Centrifugal force separates phases within the tube, which then exit, gas from the top through a central gas orifice and liquids from the bottom through peripheral openings. A vortex is formed inside the tube. In a preferred embodiment, the bottom of each tube is submerged below the liquid surface to a depth that prevents the gas vortex from blowing out the bottom.

An essential characteristic of a vortex tube is that it uses flow energy constructively to separate phases whereas in impingement and diffusion devices flow energy is counter-productive to separation, and so they seek to dissipate flow energy as non-destructively as is practical. ("Destructive" refers to the tendency of hydraulic agitation to mix, rather than to separate phases). This invention herein includes an improved vortex tube that is usually employed in a vortex tube cluster.

The disclosure herein covers a vortex tube system which produces optimum performance for a variety of process circumstances and conditions.

One improvement described herein minimizes fluid shear by shielding the axially flowing gas stream leaving the top of the tube from the feed stream as it enters the tube tangentially. It consists of a 'vortex finder', which shields the vortex tube outlet stream from disturbance by the inlet stream. It is comprised of a vertical tube the same size as the gas orifice and concentric with the vertical vortex tube and protrudes from the orifice plate on top downward to below the lowest point of the vortex tube entry. This improvement also includes a method of diverting the fluid already rotating circumferentially about the tube as it completes its first rotation from the entering stream. This is done by directing the inlet stream downward using a deflector at such an angle as to miss the tube inlet after one revolution. The deflector diverts the incoming fluid stream downward at the necessary angle. A benefit of using this method is that a smaller amount of liquid mist is carried out of the tube with the gas stream.

Figure 9:
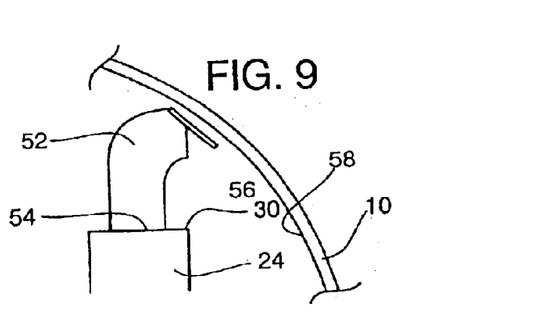
FIG. 9 is a view similar to FIG. 8 except it shows the wall of a cylindrical vessel in which the vortex tube is positioned and showing the gas flow diverter as being positioned adjacent the vessel cylindrical wall and shows the use of a shield to direct exhaust gas away from the vessel sidewall. This configuration is used instead of that in FIG. 8 when available space does not permit the FIG. 8 design.

Occasionally the gas flow velocity inside a vortex tube may exceed the ideal design limits, either continuously or intermittently due to slugging. This excessive velocity re-entrains liquid mist, and causes the gas stream to spit coarse mist droplets out of the gas orifice. Uncontained, these droplets can result in separator liquid carryover. A second improvement described herein is a method for diverting the gas outlet from the vortex tube downward so that any entrained liquid is directed toward the standing liquid phase. A curved outlet tube is installed on top of the gas orifice to catch these large droplets and direct them harmlessly downward towards the standing liquid. The deflecting tube must arch down sufficiently to create this downward velocity component but does not need to point directly down. If space limits the curve of the tube, it can be modified as shown in FIG. 9. The benefit of this device is that it allows a smaller tube cluster, making the unit more competitive and giving a greater flow turndown to the device without carryover.

In the operation of a vortex tube it is important to control the flow of liquid as it is discharged from the tube bottom. This is done by changing flow direction—that is, to direct the liquid discharge from the tube upward instead of outward by using a tube-on-tube device. This is important if there is any gas carry under from the tube. Gas exiting the bottom of the tube, if allowed to radiate outward, can propel gas-laden liquid towards the liquid outlet, resulting in carry under of gas from the separator vessel. The tube-on-tube design projects this flow upward so that gas more quickly reaches the gas-liquid surface. This tends to keep the gas entrainment localized, allowing a quiet zone in the separator to be more gas-free. The benefit of the tube-on-tube design results in more gas-free liquid leaving the separator.

The liquid release point for a typical vortex tube is located well beneath the liquid surface. However, in low level situations or at start-up, the bottom of the tube may not be submerged. The tube-on-tube arrangement establishes tube-bottom submergence as soon as any liquid is produced. A resulting benefit of incorporating the tube-on-tube system is that during separator startup, or during low liquid level excursions, the vortex tube liquid discharge will remain submerged and will therefore function normally.

Another benefit of the tube-on-tube system is that it keeps disturbance of the oil-water interface more localized around the tube. In three-phase separators the top of the outer tube is typically located below the oil-water interface. An improvement to the tube-on-tube system is the deflector ring. If the liquid release of a tube-on-tube system is near the liquid or interface surface, the deflector ring deflects the upward momentum into a horizontal direction. By the time this deflection occurs, gas has been released and velocity has slowed by natural diffusion. This reduces surface disturbance and phase re-entrainment. The benefit is a reduction in cross-contamination between liquid phases leaving the separator.

To diffuse liquid discharged from a cluster of vortex tubes, a liquid energy absorber may be used that is in the form of a box that surrounds the entire bottom portion of a tube cluster. The box has sides, a top and a bottom, some or all of which are of perforated plate. A liquid energy absorber system reduces turbulent spots in separator liquid residence sections by diffusing vortex tube exit velocities and reduces channeling by improving fluid distribution.

In vertical separators or in large diameter horizontal separators the vertical height of vortex tubes can be significant. When this occurs, liquid separated within the tubes must fall a long distance down the tube wall. As it plunges, gravity accelerates its velocity such that when it finally impinges on the standing liquid, its high momentum re-entrains gas into the liquid phases. Concurrently, in tall vortex tubes, wall friction slows down rotational liquid velocity causing a loss of centrifugal separation as the liquid progresses down the tube. Thus at the bottom of the tube, the liquid velocity direction is nearly vertically downward. To alleviate this problem, a system employing free-fall preventers is used. The benefit of the free-fall preventer system is that gas re-entrainment and foaming are greatly minimized or eliminated, and a higher average g-force is maintained in the vortex tubes to improve phase separation within the tubes.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

A better understanding of the invention will be obtained from the following detailed description of the preferred embodiments taken in conjunction with the attached drawings.

DESCRIPTION OF THE DRAWINGS

FIG. 12 is like FIGS. 10 and 11 in that it shows the lower end portion of a vortex tube. In these figures, the liquid accumulation within the bottom of the separator vessel is shown as being a two-phase arrangement—that is, with a lower heavier phase, such as water and an upper lighter liquid phase such as oil with gas in the vessel being above the lighter liquid or oil phase. In FIG. 11, the upper end of the tube-on-tube attachment discharges into the denser liquid phase whereas in the arrangement of FIG. 12, the length of the tube-on-tube attachment is such that the upper end is above the liquid level of the lightest liquid phase so that liquid passing therethrough is distributed on top of the upper liquid phase.

FIG. 13 shows a flat diverter ring on the left side of the vortex tube—that is, a diverter ring in a horizontal plane, and on the right side of the vortex tube a curved deflector ring.

In FIG. 15 two free-fall preventers are illustrated.

DETAILED DESCRIPTION OF A PREFERRED EMBODIMENT

Figure 1:
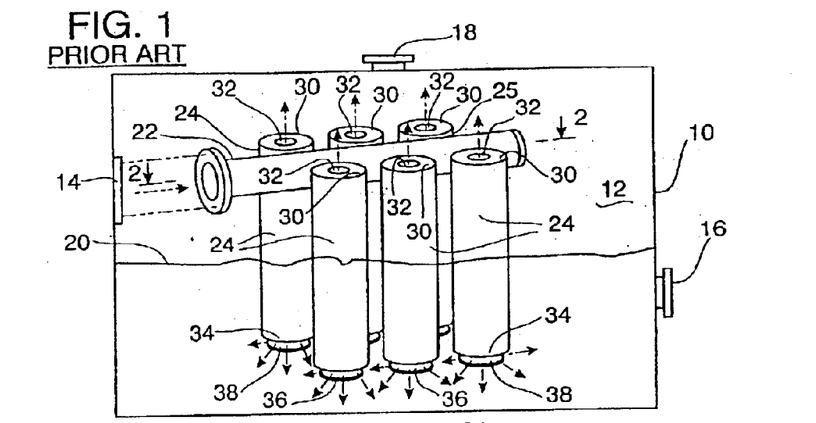
FIG. 1 shows a cluster of vortex tubes or a vortex tube assembly positioned within a separator vessel. The separator vessel is shown very diagrammatically to show a fluid inlet, a gas outlet and a liquid outlet to show very generally the environment in which the vortex tube assembly of FIG. 1 is employed.

Referring to FIG. 1, a system for separating entrained liquid components from a gas stream is diagrammatically illustrated. Generally speaking, the system of this invention employs one or more vortex tubes and the invention is specifically concerned with the construction of vortex tubes. FIG. 1 is more or less representative of the state of the prior art to which the principles of this invention apply with the intent of providing vortex tube systems to attain more effective separation of entrained immiscible liquid components from a gas stream. FIG. 1 illustrates diagrammatically a vessel 10 which can be, as an example, a horizontal cylindrical vessel or a vertical cylindrical vessel or any other type of vessel that provides a quiescent internal zone 12, a wet gas inlet 14, a liquid outlet 16 and a gas outlet 18. In the typical operation of a separator as shown in FIG. 1, a liquid level 20 is established within a lower portion of the vessel, the liquid being drawn off at a rate to approximately maintain the liquid level 20 while gas is removed from an upper portion of the vessel through an upper gas outlet 18. In the typical operation of the system of FIG. 1, a liquid level control means (not shown) is used to control the rate of liquid discharge so as to maintain a liquid level 20.

Figure 2:
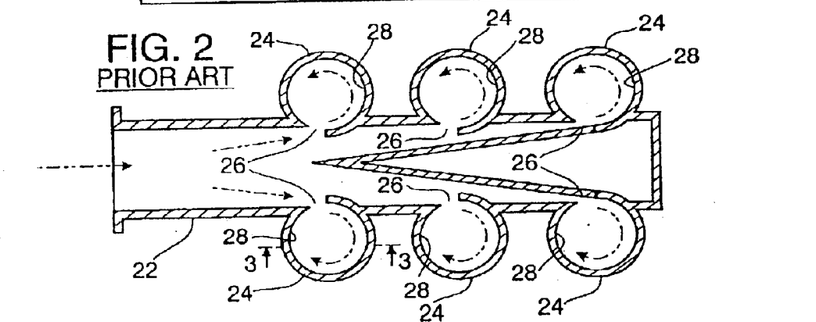
FIG. 2 is a horizontal cross-sectional view taken along the line 2—2 of FIG. 1 and showing the manner in which wet gas is introduced from the horizontal inlet tube into the vertically arranged vortex tubes.
Figure 3:
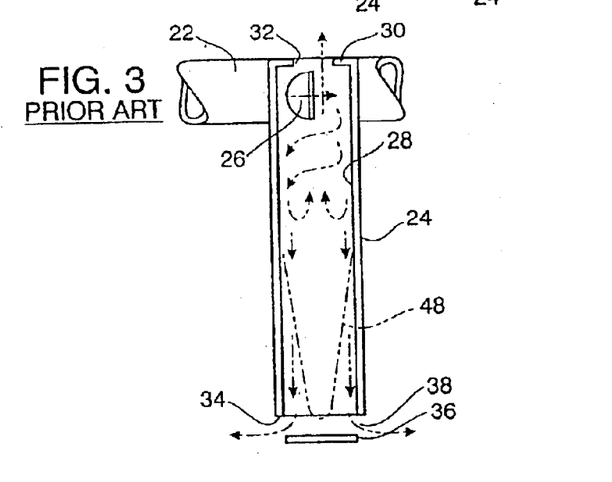
FIG. 3 is an elevational cross-sectional view of one of the vortex tubes as taken along the line 3—3 of FIG. 3.

FIG. 2 is a horizontal cross-sectional view of FIG. 1 showing a fluid injection conduit 22 that receives the wet gas from wet gas inlet 14 of the vessel of FIG. 1, and showing a plurality of vertically positioned vortex tubes 24. Each vortex tube has a wet gas inlet 26 in the vertical sidewall thereof. Wet gas under pressure flows through an opening 26 in each of the vortex tubes and enters the vortex tube tangentially—that is, at a tangent to the interior sidewall 28 of each of the vortex tubes. FIG. 3 is a cross-sectional view of a single vortex tube 24 that is representative of the other vortex tubes shown in the cluster. The upper end of each vortex tube is closed with a top plate 30 having a concentric gas outlet opening 32 therein. As seen in FIG. 3, the bottom end 34 of each vortex tube 24 is open to admit the free-flow of liquid out of the lower bottom end. A horizontally positioned bottom diverter plate is supported to the vortex tube sidewall 24 and spaced from the bottom 34 of the vortex tube to allow a circumferential liquid outlet passageway 38. Bottom diverter plate is typically supported to vortex tube 24 by spaced apart stand-offs that are not shown but can be in the form of short-length metal rods welded to the interior or exterior surface of the cylindrical wall of the vortex tube.

A vortex tube functions to separate an immiscible liquid component from a wet gas stream by utilizing artificially created gravity—that is, centrifugal force. Inlet fluids enter the fluids injection tube 22 and flows through opening 26 into the interior of the vortex tube tangentially so that the fluids swirl at a rapid rate within the vortex tube as illustrated by the dotted lines in FIG. 3. The swirling gas causes entrained liquids to be expelled and to encounter the vortex tube internal cylindrical wall 28 where the liquids accumulate and fall downwardly by gravity to ultimately flow out of the vortex tube through the liquid outlet passageway 38. The swirling gas component of the fluid stream having substantially less density than the entrained liquid component migrates to the axial center of each vortex tube 24 and flows out through the upper concentric gas outlet 26. The swirling gas is in the form of a gas vortex that takes the geometrical pattern as shown by the vortex boundary 48.

Thus FIGS. 1, 2 and 3 are representative of the state of the art to which this disclosure applies to provide the improvements to obtain more effective separation of an entrained immiscible liquid component from a wet gas stream. Systems can operate with one vortex tube which is typically oriented vertically but that can operate as long as it has a vertical downward tangent however, a vertical operation is preferred. A vessel can include a single vortex tube or a cluster of vortex tubes as shown in FIG. 1 or a plurality of clusters of vortex tubes depending on the volume of wet gas being treated and the arrangement of the vessel 10. The length of vortex tubes can vary in length; where long length vortex tubes are employed a vertically oriented vessel may be preferred but where shorter length vortex tubes are employed typically a horizontal vessel offers the most economic housing for the separation system.

The improvements of the invention are illustrated in FIGS. 5 through 16 as will now be described.

Figure 5:
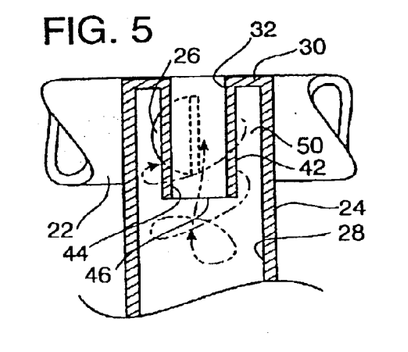
FIG. 5 is a cross-sectional view of the upper portion of a vortex tube showing one improvement of the invention herein that includes a short length vertical tubular vortex finder that serves to separate the incoming fluid stream from the gas outlet stream.

FIG. 5 illustrates an improvement of the basic concept of a vortex tube separator in the form of a tubular vortex finder 42 having an upper end connected with top plate 30 and an internal tubular wall 44 that communicates with concentric gas outlet 32. Vortex finder 42 minimizes fluid shear by shielding the axially flowing gas stream that leaves the top of the vortex tube from the feed stream as it enters the vortex tube through tangential inlet opening 26. Stated another way, vortex finder 42 shields the vortex tube outlet stream from disturbance by the inlet stream. The lower end 46 of vortex finder 42 should preferably extend below the lowest point of the vortex tube entry—that is, below the lowest point of tangential inlet opening 26.

Figure 4:
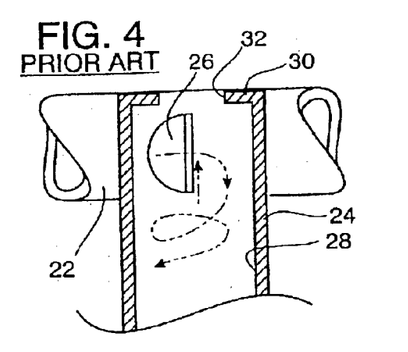
FIG. 4 is a fragmentary cross-sectional view of the upper portion of a vortex tube as shown enlarged.
Figure 6:
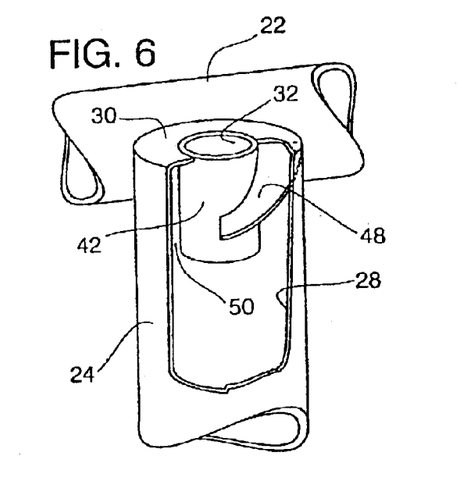
FIG. 6 is an isometric view of the upper portion of a vortex tube having a short length vortex finder as shown in FIG. 5 and further, having a downward flow diverter so that gas tangentially entering the vortex tube is immediately directed in a downward spiral tangent.
Figure 7:
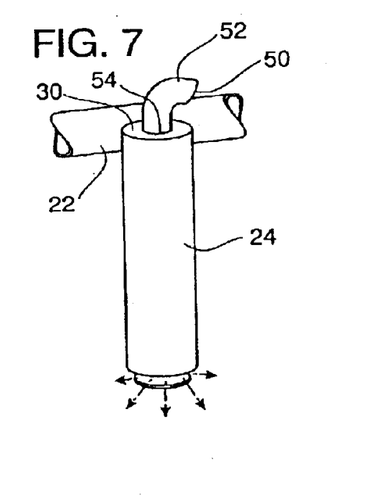
FIG. 7 is an isometric view of a vortex tube showing a gas flow diverter that is in communication with the vortex tube gas outlet on the top of the vortex tube, and that serves to direct the outlet gas in a downward tangent.
Figure 8:
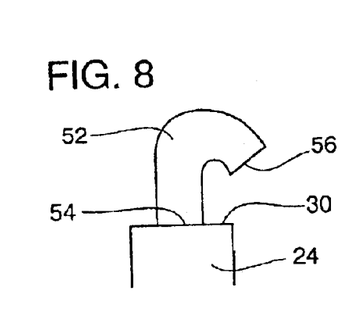
FIG. 8 is a side view of a gas flow diverter extending from the upper end of a vortex tube and showing a more U-shaped flow diverter to provide an increased downward tangent for gas passing out of the vortex tube. This is the normal configuration.

FIG. 6 is an isometric view of a portion of a vortex tube 24 that includes the improvements of FIG. 5—that is, a short length tubular vortex finder 42 but in addition includes a sloped deflector 48. Deflector 48 fits in the annular area 50 exterior of vortex finder 42 and within vortex tube internal cylindrical sidewall 28 and is spirally sloped downwardly so that the incoming gas stream that enters the vortex tube through opening 26 (seen in FIG. 5 but not seen in FIG. 6) is spirally deflected downwardly by the sloped deflector 48. The sloped deflector diverts the incoming wet gas stream downward at the necessary angle. A benefit of using the sloped defector 48 is that it minimizes liquid droplet breakup caused by shearing as the rotating stream intersects the incoming stream. As a result a smaller amount of liquid mist is carried out of the tube with the gas stream that passes upwardly through vortex finder 42, Occasionally the gas flow velocity inside a vortex tube may exceed the ideal design limits either continuously, or intermittently due to slugging. Excess flow velocity of gas re-entrains liquid mist and causes the gas stream to spit course mist droplets out of the gas orifice, that is out of the orifice 32 as in FIG. 4 or out of the vortex finder 42 in the embodiment of FIGS. 5 and 6. Uncontained, these droplets can result in separator liquid carry-over—that is, the liquid that is contained in the rapidly discharged gas is carried upwardly into the vessel into the compartment where gas is intended to accumulate instead of downwardly into the area where the liquid should accumulate. To overcome this problem, a method of diverting the gas outlet from the vortex tube downwardly so that any entrained liquid is directed toward the standing liquid phase is illustrated in FIGS. 7, 8 and 9. FIG. 7 shows the vortex tube 24 with top plate 30, the vortex tube extending from and receiving the inlet of gas from wet gas injector conduit 22. Affixed to top plate 30 is a gas flow diverter 52 that is a bent tubular member having an inlet end 54 connected to the concentric dry gas outlet in a top plate 30, the two being curved so that its outlet end 56 is directed in a downward tangent that is, gas flow through gas flow diverter 52 makes a transition of more than 90°. By the downward diversion of the gas passing out of the vortex tube, any entrained droplets are directed downwardly toward the liquid that collects in the bottom of the vessel, such as the liquid shown in the bottom of vessel 10 that has a liquid level 20.

FIG. 8 is an elevational view of the top portion only of the vortex tube 24 showing the tubular dry gas flow diverter in which the outlet end 46 has a more downward inclination. It can be seen that, if desired, the tubular gas flow diverter 52 could include a bend of 180° so that the gas is directed vertically downwardly if desired however, any downward direction imparted to droplets that pass out with the gas is very beneficial in preventing re-entrainment of the liquid with the exiting gas stream.

FIG. 9 shows a special application of the gas diverter of FIGS. 7 and 8 where the outlet end 56 of the tubular gas diverter is closely spaced to the internal wall surface 58 of a vessel 10 in an arrangement that does not permit sufficient space to provide a fully arcuate downwardly directed bent tubular gas flow diverter 52 as shown in FIG. 8. In this predicament, downward diversion of any fluid droplets carried by the gas stream exiting vortex tube 24 can be deflected by use of an angular diversion shield 60 welded or otherwise attached to tubular gas diverter 52.

Figure 10:
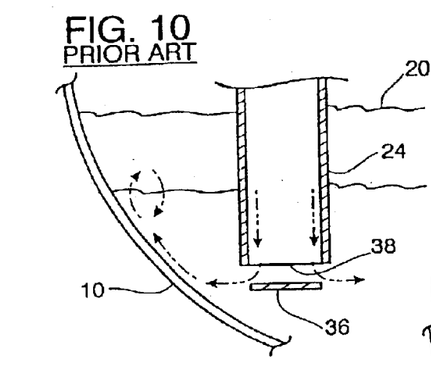
FIG. 10 shows in cross-section the bottom end portion of a vortex tube, the vortex tube extending below a liquid level established within a vessel. A portion of the vessel is shown. Spaced from the lower end of the vortex tube is a bottom diverter plate that serves to spread the flow of liquid exiting from the vortex tube. The bottom diverter plate also serves to decrease the possibility that the gas vortex formed within the diverter tube can elongate to extend out the lower end of the vortex tube.

In the operation of a vortex tube it is important to control the flow of liquid being discharged from the lower end of the tube and to prevent the gas vortex formed inside the tube from extending beyond the lower end of the tube and thereby into the liquid chamber in the bottom of the separator vessel. For this purpose, a bottom diverter plate has been used such as shown in FIG. 10 and that has previously been described with reference to FIG. 1, the bottom diverter plate 36 having been described with reference to FIGS. 1 and 3.

Figure 11:
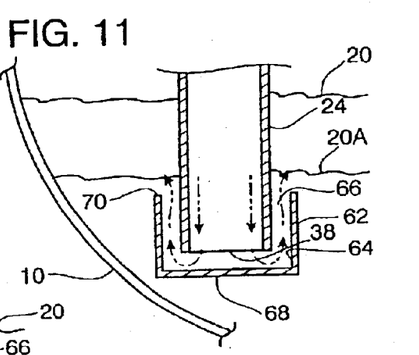
FIG. 11 is a view of the bottom portion of a vortex tube as in FIG. 10 but showing the use of a tube-on-tube attachment that provides a short length annular space at the lower end of the vortex tube through which liquids passing out of the vortex tube travels. The tube-on-tube arrangement of FIG. 11 decreases the turbulence of the fluid flowing from the vortex tube and further decreases the possibility that the gas vortex formed within the tube can extend out the lower end thereof
Figure 12:
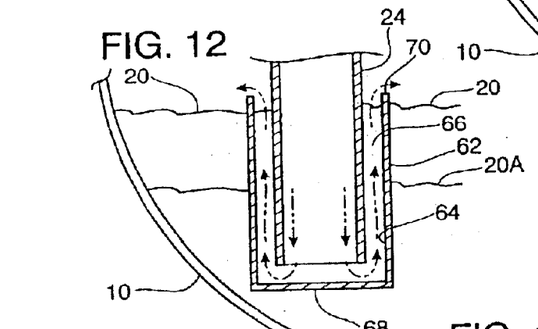
Figure 13:
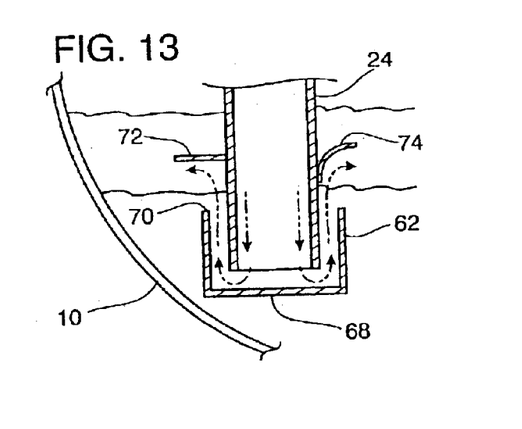
FIG. 13 is a cross-sectional view of a lower portion of a vortex tube, having a "tube-on-tube" flow diverter as in FIG. 11 with the addition of a horizontal deflector ring.

An improved method of controlling the fluid flow out the bottom end 34 of a vortex tube 24 is shown in FIGS. 11, 12 and 13. Each of these figures show the lower end portion of the vortex tube 24 positioned within a vessel having a vessel wall 10 with the vortex tube lower end 46 being below the level of liquid 20. In FIGS. 10 to through 13, liquid level 20 is shown wherein the separated liquid is of two-phase. For instance, in separating liquid from a gas stream in the petroleum industry it is common that the separated liquid be co-mingled water and oil and preferably these liquids are separately removed from the interior of the separator vessel—that is, a separator can be operated where all the separated liquids are discharged in a common stream but in many applications it is desirable that if the liquid is of two-phases, the two phases be separately discharged. As shown in FIGS. 10 through 13, the liquid is in two-phase providing a water phase 20 having a liquid level 20A and on top of the water level an oil phase that has the top liquid level 20. In any event, in FIGS. 10 through 11, the lower end 38 extends into the bottom liquid phase—that is, below the intermediate liquid level 20A. If there is any possibility that a high liquid flow rate from vortex tube 24 can cause entrained gas to flow out the lower end 46, of vortex tube 24, if allowed to radiate outwardly, can propel gas-laden liquid toward the liquid outlet, resulting in a carry under of gas from the separator vessel. To prevent this, a tube-on-tube arrangement is exceedingly useful, such as shown in FIGS. 11 through 13. This system requires a short length exterior tubular member 62 that has an internal wall 64 of a diameter greater than the external diameter of vortex tube 24 providing an annular area 66 therebetween. The lower end of tubular member 62 is closed with a bottom plate 68 so that all fluids exiting the lower end of the vortex tube pass upwardly through the annular area 66 and are dispersed around the exterior of vortex tube 24. In FIG. 11, the top end 70 of tubular members 62 is below the intermediate liquid level 20A. In the embodiment in FIG. 12, the top end 70 is above liquid level 20 so that fluid flows out on top of the level of liquid and is spread over the liquid contained in the bottom of the vessel. It can be seen that the length of tubular member 62 could be varied according to design requirements and, as an example, could be of an intermediate length between that shown in FIGS. 11 and 12 so that the top end 70 is above the intermediate liquid level 20A but below the top liquid level 20.

FIG. 13 shows an alternate arrangement wherein there is provided, in addition to the tube-on-tube method a horizontal distributer plate 72 that is positioned above the top end 70 of tubular member 62. This planer horizontal distributer plate 72 extends radially around vortex tube 24 for a full 360° in the practice of the invention. Instead of the circumferential distributer plate being horizontal as shown in element 62, the circumferential distributor plate can be arcuate as shown in the right side of vortex tube of FIG. 13, the arcuate circumferential distributer plate being indicated by the numeral 74. Whether a horizontal circumferential distributer plate or an arcuate circumferential distributor plate 74, any disturbance of the oil/water interface caused by liquid exiting the lower end of the vortex tube 24 is more localized around the tube. If the liquid release of the tube-on-tube system is near the liquid interface surface, the deflector ring either 70 or 72 deflects the upper momentum of the flowing liquid into a horizontal direction. This reduces the surface disturbance either the surface 20A or the top liquid surface 20 to thereby reduce phase re-entrainment. The benefit of the system of FIG. 13 is a reduction in cross-contamination between liquid phases leaving the separator.

Figure 14:
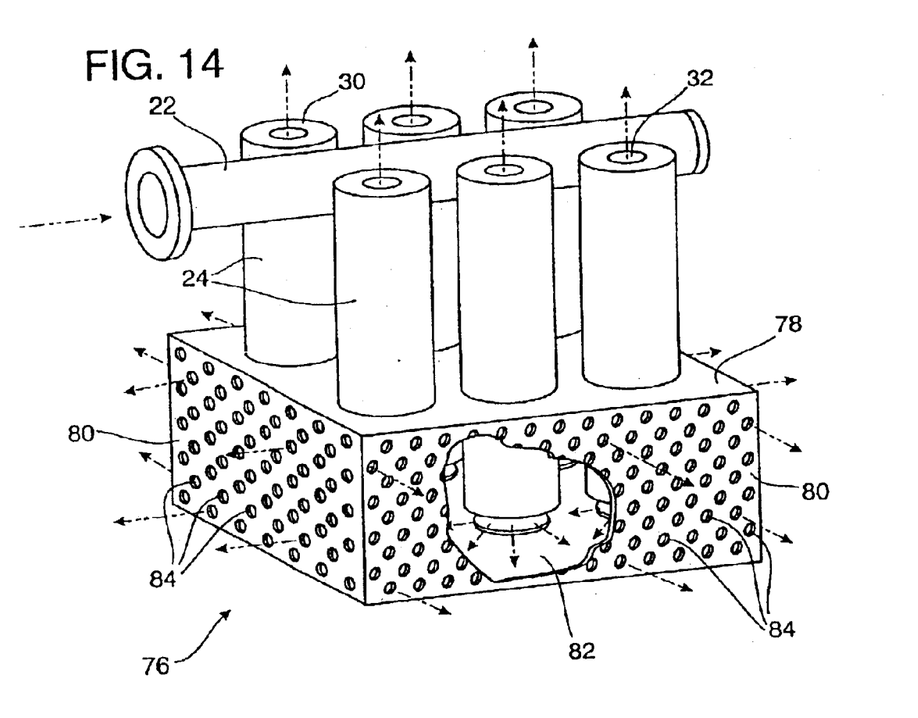
FIG. 14 is an isometric view of a cluster of vertically oriented vortex tubes fed by an inlet manifold tube and showing the lower end portions of each of the vortex tubes making up the cluster as encompassed within a liquid energy absorber. The liquid energy absorber is formed of an enclosure that can be rectangular as illustrated and that is highly perforated to let fluid freely flow out but in a way to diffuse the fluid flow and thereby minimize turbulence.

FIG. 14 shows a cluster of vortex tubes as seen in FIG. 1 with the installation of a liquid energy absorber 76 which also may be referred to as a liquid energy diffuser. The energy absorber or diffuser is generally indicated by the numeral 76 and is in the form of a container having a top 78 and four sidewalls 80, only two of which are seen in FIG. 14 and a bottom 82. The sidewalls are perforated at 84. If desired the top 78 and/or bottom 82 could, in like manner, be perforated. Liquid energy absorber 76 reduces turbulent spots in the liquid collected in the bottom of the separator by diffusing the exits from the vortex tube and reduces channeling of fluid flow by improved fluid distribution. While in FIG. 14, the liquid energy absorber is shown as a box enclosure that is, in a horizontal plane rectangular, the enclosure could be circular, spherical or any other shape the only requirement being that the liquid energy absorber provide a closed area encompassing the lower ends of each vortex tube making up a cluster of vortex tubes to diffuse and break up fluid channel flow paths that might otherwise be created within the fluid collected in the bottom of a separator vessel.

Figure 15:
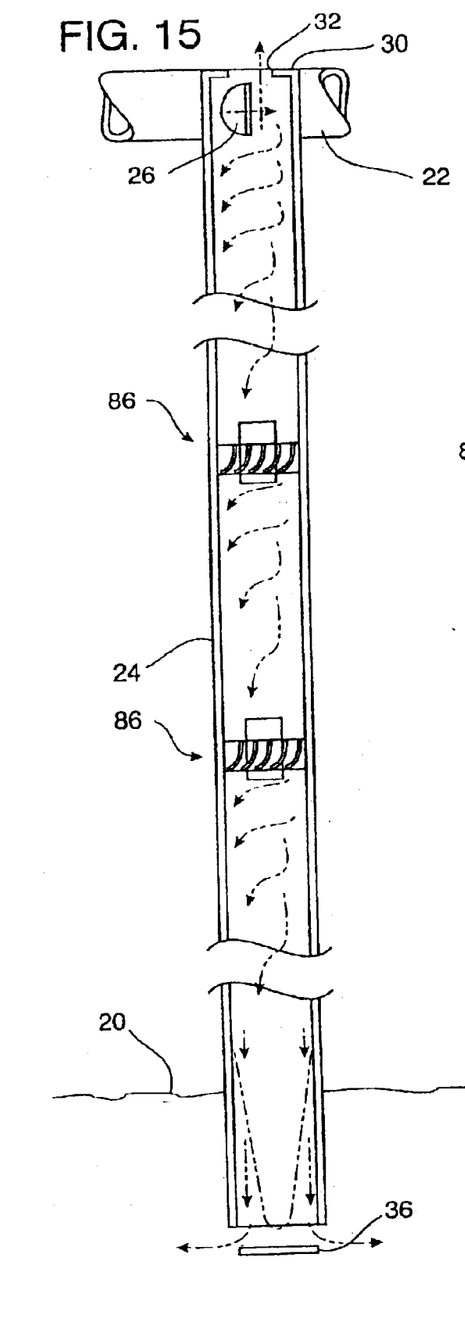
FIG. 15 is an elevational view of a vertically-oriented vortex tube fed by an inlet conduit and showing the employment of spaced apart free-fall preventers within the vortex tube.
Figure 16:
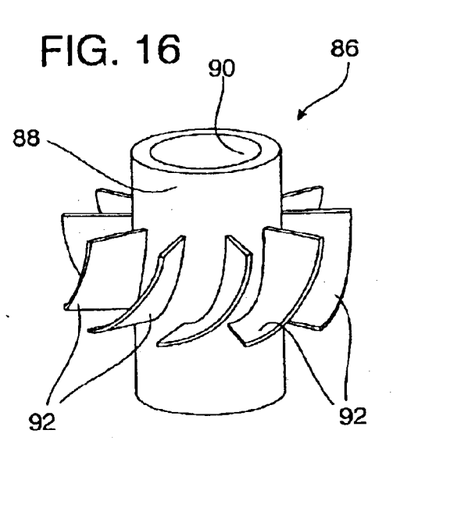
FIG. 16 is an isometric view of a free-fall preventer of the type positioned within the vortex tube as illustrated in FIG. 15.

FIG. 15 shows an alternate embodiment of a vortex tube separator system in which there is positioned within the vortex tube one or more free-fall preventers, the free-fall preventers being generally indicated by the numeral 86. FIG. 16 is an isometric view of a free-fall preventer that is preferably formed of a short length center tube 88 with an open tubular passageway 90 therethrough. Radially extending around the external circumference of center tube 88 are a plurality of vanes 92. These vanes extend out to contact the internal cylindrical wall of vortex tube 24.

In vertical separators or in large diameter horizontal separators, the vertical height of vortex tube 24 can be significant. When this occurs, liquid separated within the tubes must fall a long distance down the tube wall. As the liquid plunges, gravity accelerates this velocity such that when it finally impinges on the standing liquid that would be approximately at the height of liquid level 20, its high momentum tends to re-entrain gas into the liquid phase. Concurrently, in such tall vortex tubes wall friction slows down the rotational liquid velocity causing a loss of centrifugal separation as the liquid progresses down the tube. Thus, at the bottom of the tube the liquid velocity direction is nearly vertically downward. To alleviate this problem the free-fall preventers 86 can be employed. The benefit of the use of free-fall preventers 86 is that gas re-entrainment and foaming are greatly minimized or eliminated and a higher average centrifugal force is maintained in the liquids swirling within the vortex tube. Note that swirling gas that has not yet migrated to the center of the tube passes downwardly through the vanes and as it passes downwardly, additional swirling action is imparted. Gas that migrates toward the center of the vortex passes freely upwardly through the open passageway 90 in center tube 88 of each of the free-fall preventers and thus the gas can flow outwardly through the concentric gas outlet opening 32 and the top of each of the vortex tubes.

FIG. 15 shows use of two spaced apart free-fall preventers but only one may have been employed or more than two may be employed according to the length of the vortex tube 24.

The improved separator system of this invention can be practiced employing various combinations of the improved vortex tube features as has been described herein according to design perameters dictated by the particular entrained liquid verses volume of gas in the wet gas stream, by the nature of the entrainment—that is, whether in relatively small or relatively large droplets, the nature of the liquid whether heavy such as water or relatively light such hydrocarbon condensate, and many other parameters.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A system for separating an entrained immiscible liquid component from a wet gas stream comprising:
   a vessel having an interior in communication with a wet gas inlet, a gas outlet and a liquid outlet;
   at least one vortex tube supported within said vessel interior, the vortex tube having an internal wall surface, a first end, an outlet end, and a wet gas tangential inlet in and tangential to said internal wall surface, the tangential wet gas inlet being spaced from said first end and arranged so that wet gas entering therein rotates within said vortex tube to cause at least some of the liquid components to be forced against said internal wall surface by centrifugal action;
   an orifice plate closing said vortex tube first end and having a concentric gas outlet opening therein; and
   a liquid discharge deflector tube secured in relationship to an external portion of said vortex tube and encompassing said vortex tube outlet end, the deflector tube being of internal diameter greater than the external diameter of said vortex tube at said outlet end providing an external annular area having an open top, the deflector tube having a bottom end; and
   an end plate at least substantially closing said bottom end of said deflector tube to thereby deflect liquid flowing out said vortex tube outlet end into an upward direction through said external annular area.

2. A system according to claim 1 wherein said vortex tube is at least essentially vertical with said outlet end below said inlet end and wherein said outlet end is positioned below a liquid level surface within said vessel and wherein said liquid discharge deflector tube has an open top end providing an annular outlet that is vertically positioned within said vessel above said liquid level surface.

3. A system according to claim 1 wherein said vortex tube is at least essentially vertical with said outlet end below said inlet end and wherein said outlet end is positioned below a liquid level surface within said vessel and wherein said liquid discharge deflector tube has an open top end providing an annular outlet that is vertically positioned within said vessel below said liquid level surface.

4. A system according to claim 1 wherein said vortex tube is at least essentially vertical with said outlet end below said inlet end and wherein said vortex tube outlet end is positioned below an oil/water interface liquid level within said vessel that is below a hydrocarbon liquid level and wherein said liquid discharge deflector tube has an open top end providing an annular outlet within said vessel that is vertically positioned below said hydrocarbon liquid level and above said oil/water interface liquid level.

5. A system according to claim 1 including circumferential radially extending distributor plate affixed exteriorally of said vortex tube and spaced above said deflector tube open top.

6. A system according to claim 1 including a circumferential arcuate distributor plate affixed exteriorally of said vortex tube and spaced above said deflector tube open top.

7. A system according to claim 1 including a vortex finder tube in communication with said orifice plate gas outlet opening and extending concentrically within said vortex tube outlet.

8. A system according to claim 1 including a curved outlet pipe affixed to said orifice plate on exterior of said vortex tube and in communication with said vortex tube central opening and configured to divert gas passing out of said orifice plate gas outlet opening in a direction having a downward tangent.

9. A system according to claim 1 including:
   an energy absorbing housing providing a quiescent inducing cavity surrounding said outlet end of said vortex tube, liquid flowing out said outlet end of said vortex tube flowing into said quiescent inducing cavity provided by said energy absorbing housing, said energy absorbing housing having cavity walls defining said quiescent inducing cavity, said cavity walls having small diameter openings through which liquid passes into the interior of said vessel.

10. Apparatus for separating an entrained immiscible liquid component from a wet gas stream comprising:
    a vortex tube having an internal wall surface, a first end, an outlet end, and a wet gas tangential inlet in and tangential to said internal wall surface, the tangential wet gas inlet being spaced from said first end and arranged so that wet gas entering therein rotates within said vortex tube to cause at least some of the liquid components to be forced against said internal wall surface by centrifugal action;
    an orifice plate closing said vortex tube first end and having a concentric gas outlet opening therein;
    a liquid discharge deflector tube secured in relationship to an external portion of said vortex tube and encompassing said vortex tube outlet end, the deflector tube being of internal diameter greater than the external diameter of said vortex tube at said outlet end providing an external annular area having an open top, the deflector tube having a bottom end; and an end plate at least substantially closing said bottom end of said deflector tube to thereby deflect liquid flowing out said vortex tube outlet end into an upward direction through said external annular area.

11. Apparatus for separating an entrained immiscible liquid component from a wet gas stream according to claim 10 including a vortex finder tube in communication with said orifice plate gas outlet opening and extending concentrically within said vortex tube outlet.

12. Apparatus for separating an entrained immiscible liquid component from a wet gas stream according to claim 10 including a curved outlet pipe affixed to said orifice plate exterior of said vortex tube and in communication with said vortex tube central opening and configured to divert gas passing out of said orifice plate gas outlet opening in a direction having a downward tangent.

13. Apparatus for separating an entrained immiscible liquid component from a wet gas stream according to claim 10 including:

an energy absorbing housing providing a quiescent inducing cavity surrounding said outlet end of said vortex tube, liquid flowing out said discharge deflector flowing into said quiescent inducing cavity provided by said energy absorbing housing, said energy absorbing housing having cavity walls defining said quiescent inducing cavity, said cavity walls having small diameter openings through which liquid passes into the interior of said vessel.

14. Apparatus for separating an entrained immiscible liquid component from a wet gas stream according to claim 10 wherein said vortex tube is at least essentially vertical with said outlet end below said inlet end and wherein said outlet end is positioned below a liquid level surface within said vessel and wherein said liquid discharge deflector tube has an open top end providing an annular outlet that is vertically positioned within said vessel above said liquid level surface.

15. Apparatus for separating an entrained immiscible liquid component from a wet gas stream according to claim 10 wherein said vortex tube is at least essentially vertical with said outlet end below said inlet end and wherein said outlet end is positioned below a liquid level surface within said vessel and wherein said liquid discharge deflector tube has an open top end providing an annular outlet that is vertically positioned within said vessel below said liquid level surface.

16. Apparatus for separating an entrained immiscible liquid component from a wet gas stream according to claim 10 wherein said vortex tube is at least essentially vertical with said outlet end below said inlet end and wherein said vortex tube outlet end is positioned below an oil/water interface liquid level within said vessel that is below a hydrocarbon liquid level and wherein said liquid discharge deflector tube has an open top end providing an annular outlet within said vessel that is vertically positioned below said hydrocarbon liquid level and above said oil/water interface liquid level.

17. Apparatus for separating an entrained immiscible liquid component from a wet gas stream according to claim 10 including circumferential radially extending distributor plate affixed exteriorly of said vortex tube and spaced above said deflector tube open top.

* * * * *